United States Patent [19]

Hedberg et al.

[11] Patent Number: 5,015,276

[45] Date of Patent: May 14, 1991

[54] CABINET AND VAPOR TRAP

[75] Inventors: Donald D. Hedberg; Michael H. Litin, both of Janesville, Wis.

[73] Assignee: Lab Safety Supply, Inc., Janesville, Wis.

[21] Appl. No.: 442,913

[22] Filed: Nov. 28, 1989

[51] Int. Cl.[5] .................... F26B 21/06; B01D 50/00

[52] U.S. Cl. .................... 55/384; 34/81

[58] Field of Search .................... 34/80, 81, 18, 90, 91, 34/60; 55/387, 384, 385.1, 385.4, 490, 515

[56] References Cited

U.S. PATENT DOCUMENTS

| | | | |
|---|---|---|---|
| 78,437 | 6/1868 | Doolittle | 34/81 |
| 1,482,626 | 2/1924 | Whiting | 34/81 |
| 1,972,368 | 9/1934 | Alex | 34/80 |
| 4,014,670 | 3/1977 | Young | 55/384 X |

*Primary Examiner*—Henry A. Bennet

*Attorney, Agent, or Firm*—Howard M. Herriot

[57] ABSTRACT

Disclosed is a cabinet for storing containers of volatile hazardous liquids, the cabinet having therein, in a place out of the way of the containers stored therein, a vapor trap for adsorbing and/or neutralizing vapors of said liquids. The vapor trap may be fastened in the cabinet to be easily removed, and replaced, or to be chemically or mechanically recharged and then replaced. The trap has an outer perforate shell containing therewithin vapor trapping material such as a vapor adsorbing and/or a vapor neutralizing material. The material may be in loose, particulate form or may be carried in one or more fiber sheets. The shell may be of rectangular box shape or of right-triangular box shape, to enhance positioning the vapor trap in the cabinet in a place out of the way of the containers. The vapor trapping material may be activated carbon, impregnated or unimpregnated, and/or may be slaked lime or activated alumina.

9 Claims, 6 Drawing Sheets

CABINET AND VAPOR TRAP

BACKGROUND OF THE INVENTION

Storage cabinets for safely storing containers of flammable, corrosive and/or other dangerous and noxious volatile liquids are well known. Such cabinets are well insulated, and are constructed of steel or of wood or of plastic, and have one or more adjustable, sometimes-locking, steel shelves therein creating a plurality of spaces for storage of the containers, which are usually containers with seals, such as safety cans, drums, tanks or bottles. The cabinets have rabbeted doors or other doors which when closed, fit tightly. The primary function of the cabinet is to thermally insulate and isolate the stored liquids from the environment surrounding the cabinet, and to keep these liquids and their vapors from escaping and contaminating the environment surrounding the cabinet. When the doors of a cabinet are opened to access the stored containers, however, vapors which may have accumulated within the cabinet may be released to the surrounding environment, particularly when the liquids are highly volatile and/or the seals of the containers have failed or when such seals were not properly fastened before storing. Such vapors may also be released from an open container. Even safety cans may release vapors due to temperature or pressure differentials.

The release of such vapors from the cabinet is at least annoying and may allow hazardous reactions, or may be dangerous as a fire hazard or inhalation hazard depending upon the particular vapors present, and their concentrations.

SUMMARY OF THE INVENTION

This invention provides trapping means within such a cabinet to trap hazardous vapors present therein by adsorption of the vapors and/or by neutralization of the vapors, with such means located in the cabinet in a place away from the storage containers, as for example in the space above the containers and immediately below a shelf or the ceiling, or in a place in the corner of the cabinet formed by its back wall and a side wall, or formed by its back wall and the underside of a shelf. Such trapping means may be a porous or perforate outer shell having carbon or other trapping material therein for adsorbing and/or neutralizing vapors present in the cabinet. The trapping of corrosive vapors results in longer cabinet service life, and the trapping of noxious or hazardous vapors diminishes release thereof from the cabinet when it is opened. This results in less exposure of personnel to dangerous fumes and vapors and is of great health and safety benefit if the fumes or vapors are highly toxic, noxious, flammable, reactive or corrosive. The invention thus assists in complying with good safety practices and the law, by providing employment, and places of employment, free from recognized hazards to the health and safety of employees.

The trapping material may be within a perforate outer shell of the trapping means, and such material may be activated carbon particles, activated alumina particles, or other materials such as slaked lime. The material may be in the form of granules, pellets or powder, and may be loose within the shell or may be carried in sheets of paper or other porous fiber. The activated carbon may be either unimpregnated activated carbon or an impregnated activated carbon which has been impregnated with a chemical to enhance the ability to remove certain otherwise difficult to remove vapor molecules. Such impregnated carbons are available commercially; for example, the Barnebey-Cheney Company of Columbus, Ohio, sells several different types of such impregnated carbons for removal of several different molecules: type CB which is impregnated for removing mercury vapor; type CC which is impregnated for removing saturated hydrocarbons, specifically ethylene; and type CH which is impregnated for removing acid gases. Activated alumina spheres (type CP) are also available from that company, as are suitable unimpregnated activated carbons.

The outer shell may be of rectangular box shape having a height dimension small relative to its width and depth dimensions so it may be placed in the cabinet away from the storage containers and up against either the ceiling of, or the underside of a shelf of, the cabinet. The outer shell may be of a right-triangular box shape so it may be placed in the cabinet, in a corner thereof away from the storage containers: either vertically in a corner formed by the back wall and a side wall of the cabinet; or horizontally in a corner formed by the back wall of the cabinet and either the ceiling thereof or the underside of a shelf thereof.

It is an object of the invention to provide vapor trapping means for such a cabinet wherein such means is in an otherwise unoccupied space in the cabinet out of the way of the containers stored therein.

A further object is to provide such a vapor trapping means that adsorbs vapors of the liquids stored in the containers, to minimize or eliminate release of the vapors to the environment surrounding the cabinet when the cabinet doors are opened.

Another object is to provide such vapor trapping means that neutralizes acid vapors of the liquids stored in the containers to lessen or eliminate release of such vapors from the cabinet.

A still further object is to accomplish the foregoing objects with vapor trapping means which is easily installed in and removed from the cabinet, and may be refilled or recharged, or may be disposed of and replaced with a new one from time to time.

These and other objects will become apparent from the following description and the accompanying drawings.

BRIEF DESCRIPTION OF THE DRAWINGS

FIG. 1 is a top plan view of said first embodiment of a vapor trap of the invention;

FIG. 2 is a front elevation view thereof;

FIG. 3 is an end elevation view thereof;

FIG. 4 is a sectional view on line 4 of FIG. 1;

FIG. 5 is a top plan view of said second embodiment of a vapor trap of the invention;

FIG. 6 is a front elevation view thereof;

FIG. 7 is a side elevation view thereof;

FIG. 8 is an isometric view thereof;

FIG. 9 is a sectional view of line 9 of FIG. 7 illustrating one form of adsorbent within the outer shell of the trap;

FIG. 10 is a view of the outer shell flat sheet prior to being folded-up into the shell.

FIG. 11 is a front elevation view of a storage cabinet of the invention.

FIG. 12 is a sectional view on line 12 of FIG. 11;

FIG. 13 is a sectional view on line 13 of FIG. 11; and

FIG. 14 is a sectional view on line 14 of FIG. 11.

DETAILED DESCRIPTION

Figure 11:
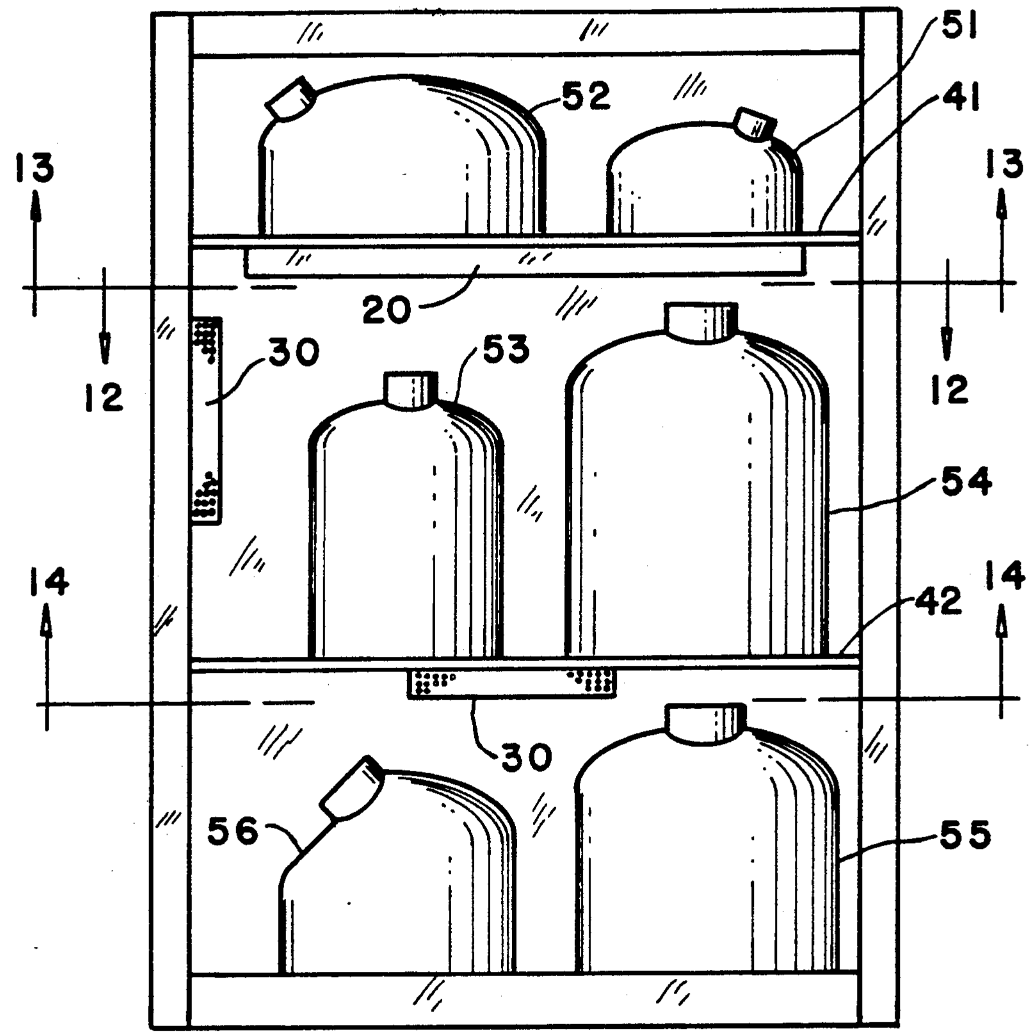
FIGS. 11–14 illustrate a storage cabinet of the invention.
Figure 12:
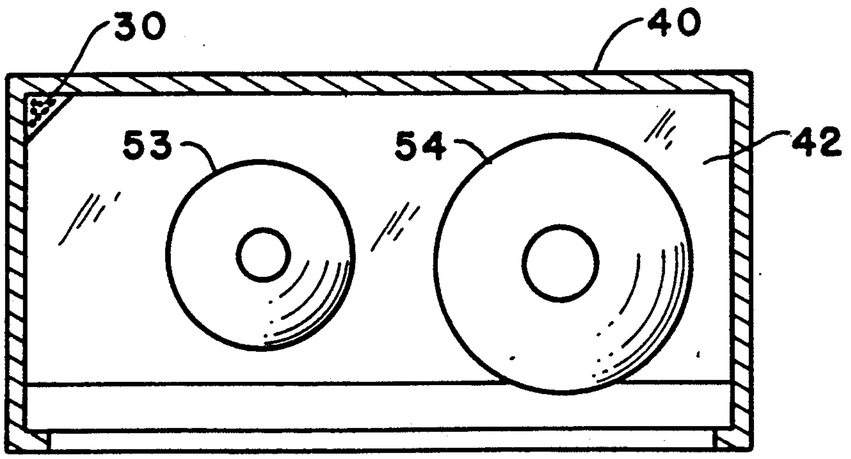
Figure 13:
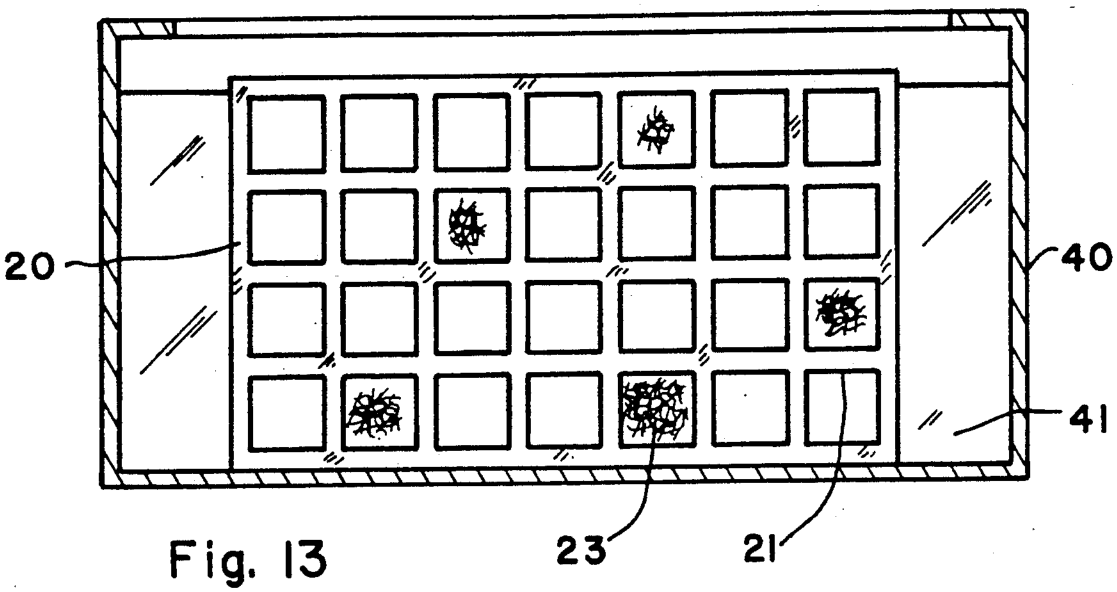
Figure 14:
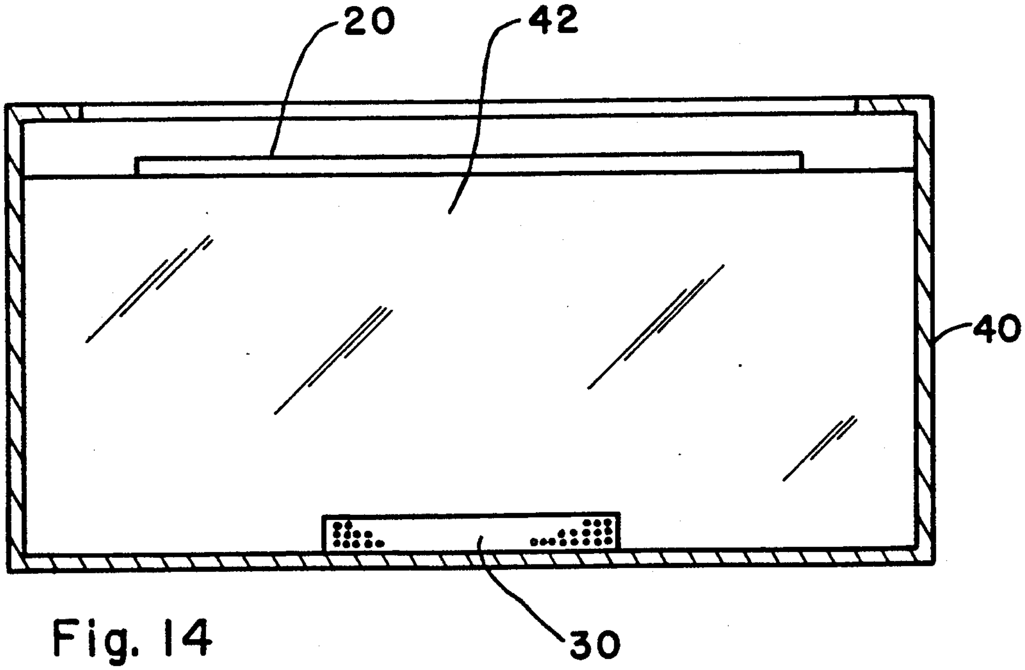

Referring to FIGS. 11–14, there is shown an open storage cabinet 40 (with its front doors not shown), having an upper shelf 41 and a lower shelf 42 therein, and having stored therein containers 51, 52, 53, 54, 55 and 56. Disposed immediately under shelf 41 and well above containers 53 and 54 is a vapor trap comprising a shell 20 having perforations or openings 21 therethrough and having within the shell vapor adsorbing material such as activated carbon and/or a vapor neutralizing material such as slaked line or activated alumina. The shell 20 is a box having a height dimension very small compared to its width and depth dimensions, the latter dimensions being somewhat comparable to those of the cabinet and shelf. Disposed immediately below shelf 42 and well above containers 55 and 56 is a different shaped vapor trap. The shell 30 of this vapor trap is of right triangular box shape, nestled horizontally into the corner formed by the bottom of shelf 42 and the back wall of the cabinet, as shown in FIGS. 11 and 14. Another such vapor trap having a shell 30 of right triangular shape is disposed well below shelf 41 and well above shelf 42, out of the way of containers 53 and 54, nestled vertically in the corner formed by the back wall and side wall of the cabinet, as shown in FIGS. 11 and 12. The shell 30 of each of these vapor traps is perforate, and within the shell is a vapor trapping material such as a vapor adsorbing material or a vapor neutralizing material.

Figure 1:
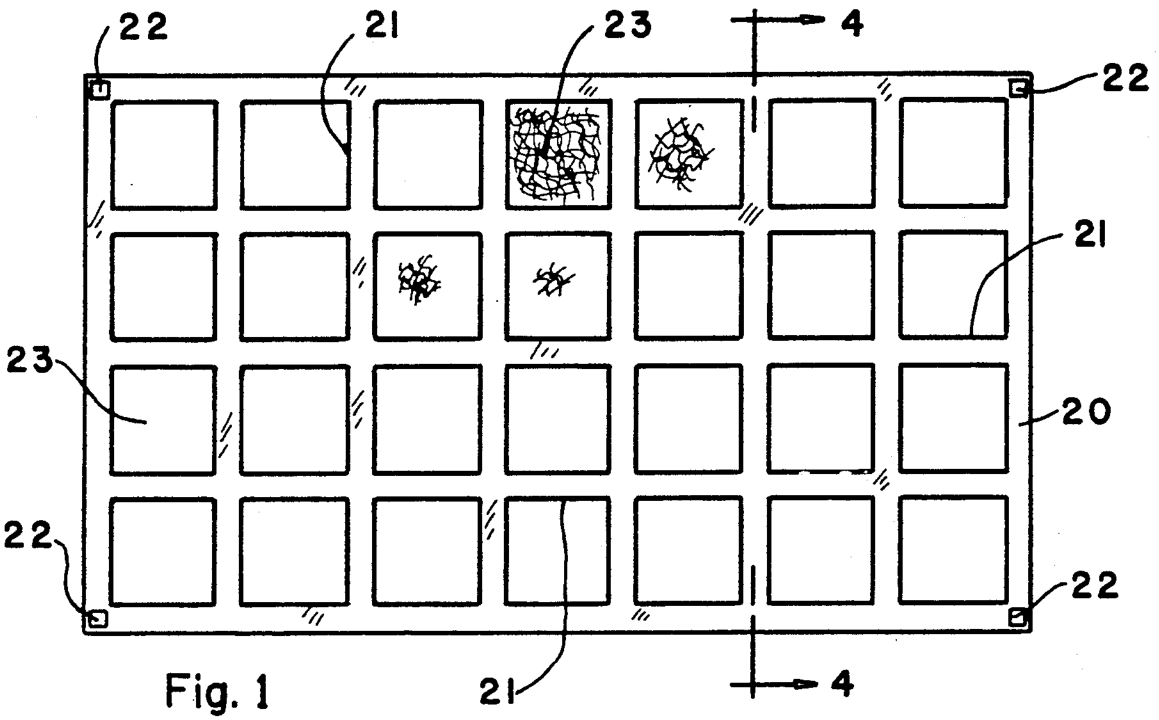
FIGS. 1–4 illustrate a first embodiment of a vapor trap of the invention.
Figure 2:
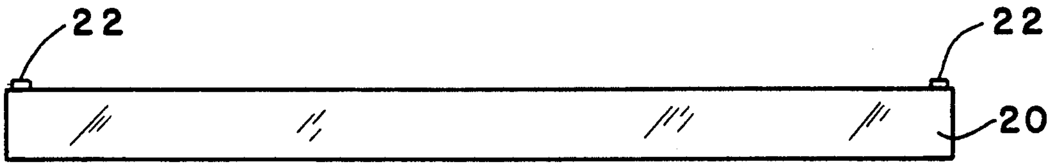
Figure 3:
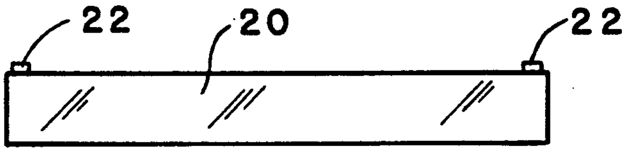
Figure 4:
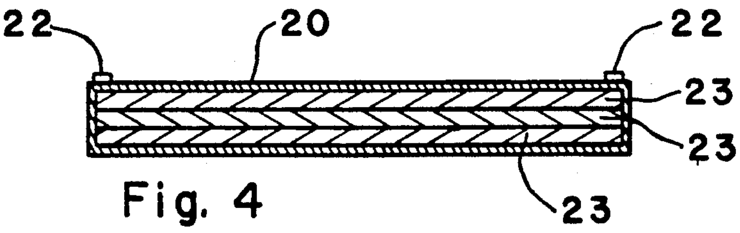

Referring to FIGS. 1–4, there is shown the vapor trap which comprises shell 20 with openings 21 therein and with fastening means 22 thereon, which may be permanent magnets or may be adhesive pads. Other fastening means such as screws, rivets, or the like could of course be used. Within the shell 20 are sheets 23 of porous fiber carrying dispersed therethroughout a vapor trapping material such as a vapor adsorbing material or a vapor neutralizing material. The width and depth dimensions of shell 20, shown in FIG. 1 are very large as compared with the height dimension of the shell 20, shown in FIGS. 2–4. As seen in FIGS. 1 and 13, the top and the bottom of shell 20 are perforated with openings 21. Such openings may be of any convenient size, and may be large when the vapor trapping material is carried by one or more fiber sheets within the shell. Such openings may be very small, as for example when the vapor trapping material within the shell is in loose particulate or granular form. The shell may even be a fine screen or a fabric, which is porous enough to allow entry of vapor molecules, and rigid enough to contain the material therewithin and to stay in place in the cabinet as shown in FIGS. 11, 13 and 14. The vapor trap may be held in the cabinet by any suitable fastening means, such as by screws or rivets, not shown, or by brackets or other hardware (not shown), or by magnets or adhesive pads 22 as shown. When the vapor trap has exhausted its capacity of adsorption and/or neutralization or vapor molecules, it is easily removable from the cabinet and may be disposed and replaced with a new one, or may have its adsorptive material replaced or chemically recharged.

Figure 9B:
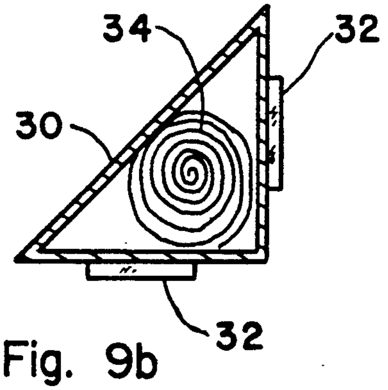
FIG. 9B is a sectional view on line 9 of FIG. 7 illustrating another form of adsorbent within the outer shell.
Figure 9:
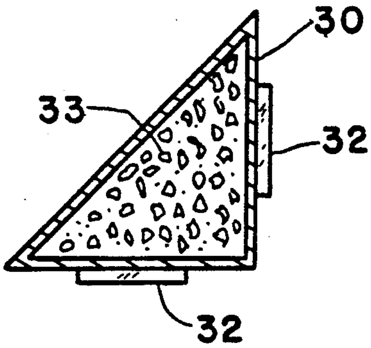
FIGS. 5–10 illustrate a second embodiment of a vapor trap of the invention.
Figure 5:
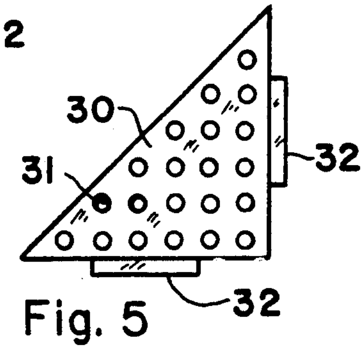
Figure 6:
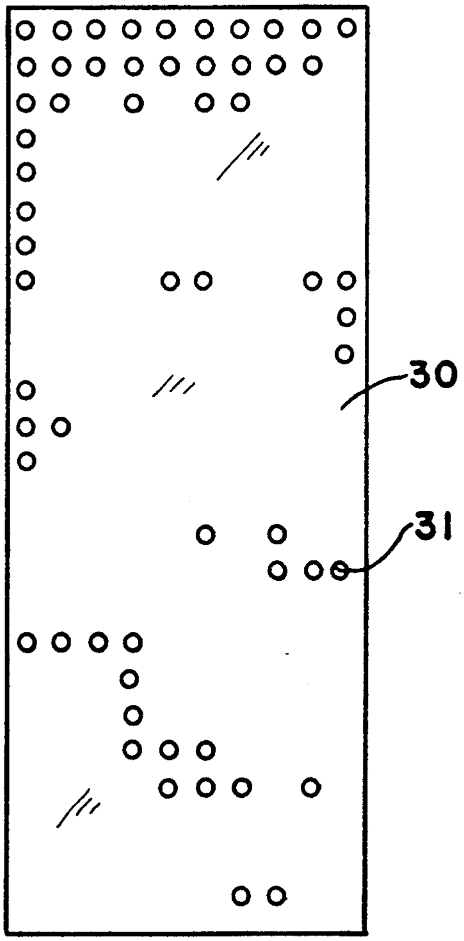
Figure 7:
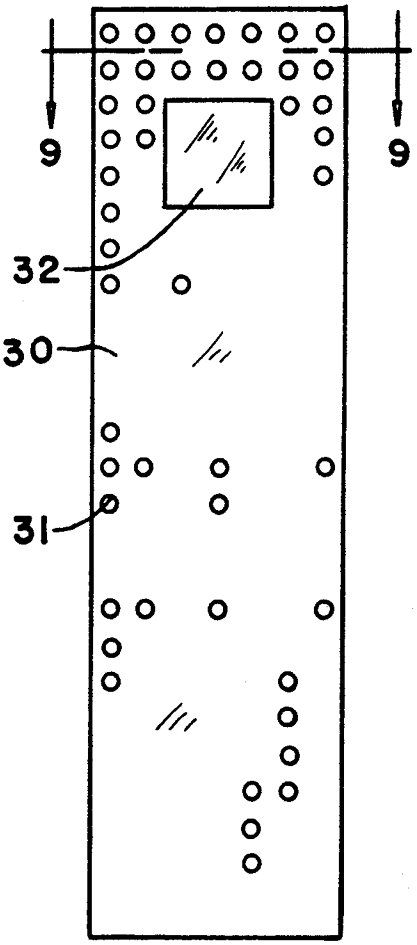
Figure 8:
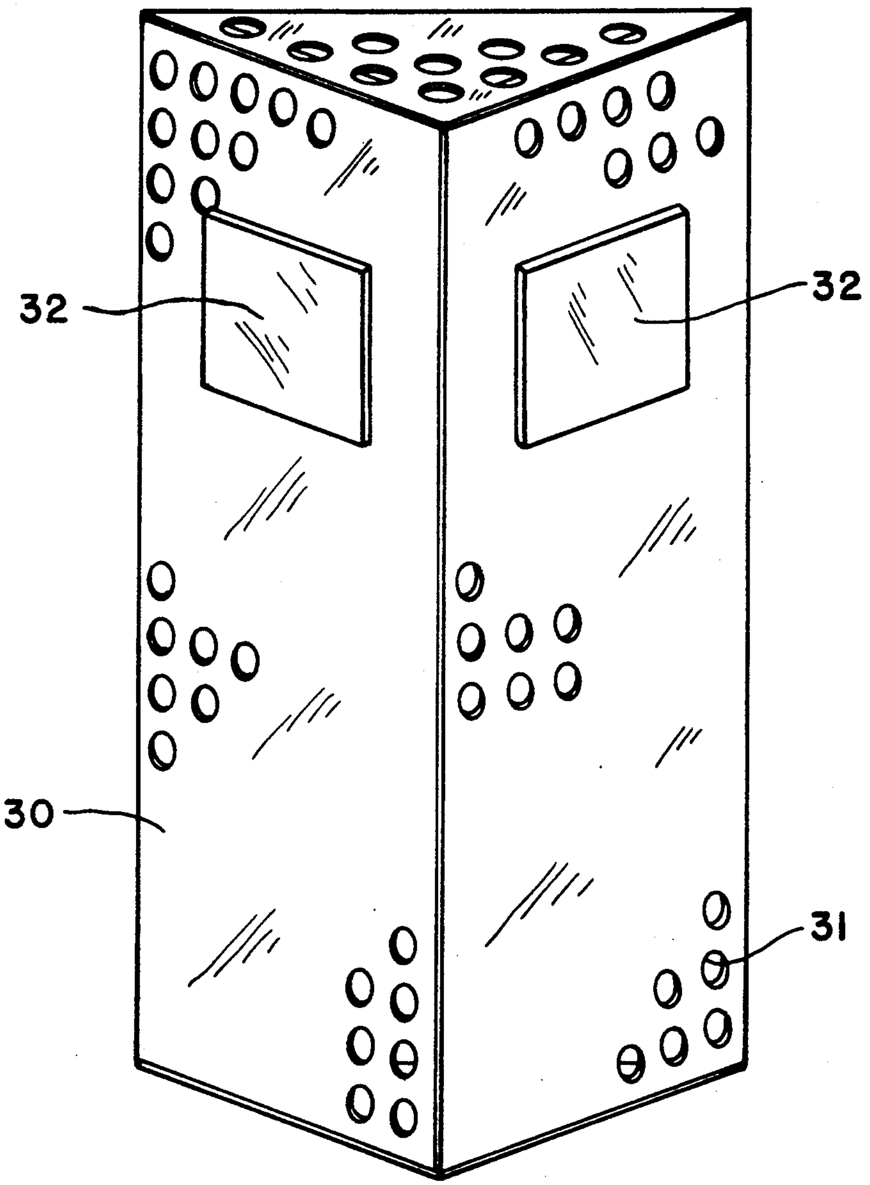
Figure 10:
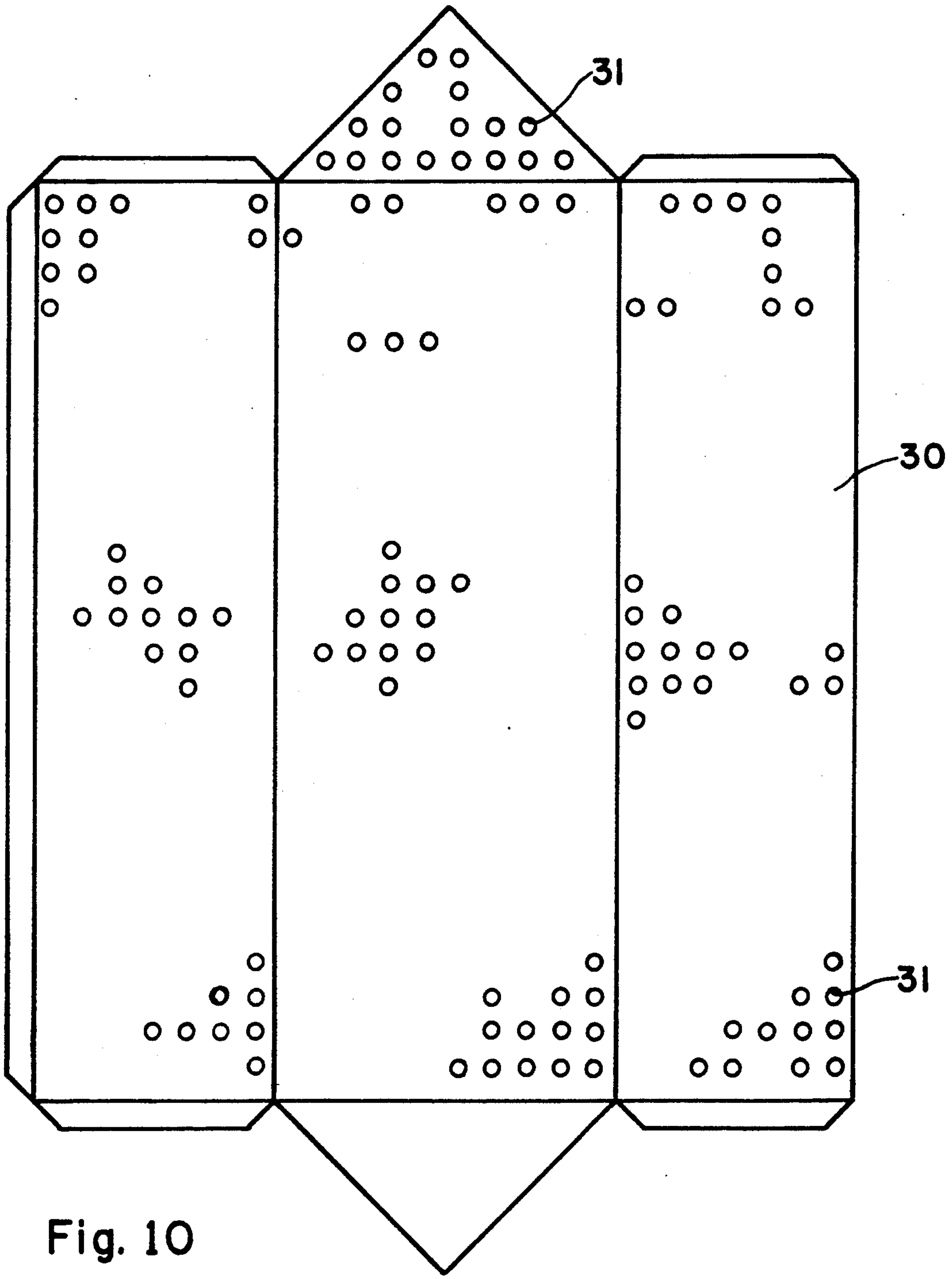

Referring to FIGS. 5–10, the vapor trap is a perforate shell 30 of right-triangular shape, having perforation openings 31 in all its five walls: the walls are the front hypotenuse side; the two other sides; and the two ends. The shell 30 may be made by folding-up portions thereof from the flat sheet form shown in FIG. 10, or may be made from two or more separate sheets. Fastening means such as magnets 32 are disposed on a side of the shell. Such means could be adhesive pads or other fasteners, as well. Within the shell 30, the vapor trapping material may be in particulate form such as material 33 as shown in FIG. 9, or may be carried by a fiber sheet coiled up within the shell, as shown in FIG. 9B. A plurality of separate sheets (not shown) could, if desired, be arranged within the shell, coiled or stacked flat, or in any other desired manner, as well.

One or more vapor traps of either or both the rectangular box type or right triangular box type may be placed in the cabinet, located away from the containers, as shown in FIGS. 11–14, and may be replaced easily with new ones as needed, to trap vapors of the stored liquids, to prevent or reduce release of those vapors to the surrounding environment.

What is claimed is:

1. A vapor trap, for use in a rectangular box shaped steel cabinet storing upright cylindrical containers of volatile hazardous liquids, to trap vapors of said liquids escaping from said containers, said vapor trap comprising an outer shell having therewithin a vapor trapping material, said shell being of right-isosceles triangular box shape having a perforate rectangular hypotenuse front, two rectangular sides and two right-isosceles triangular ends, and said shell having on one of said sides fastening means to fasten said trap to a wall of said cabinet, whereby said trap may be nestled into a corner of said cabinet and fastened there in position out of the way of, avoiding contact with, and making maximum room for, said cylindrical containers.

2. The invention of claim 1 wherein said fastening means is a magnet.

3. The invention of claim 1 wherein said vapor trapping material includes activated carbon for adsorbing said vapors.

4. The invention of claim 3 wherein said carbon is impregnated with a chemical for removing otherwise difficult to remove vapor molecules.

5. The invention of claim 1 wherein said vapor trapping material includes slaked line for neutralizing acid vapors of said liquids.

6. The invention of claim 1 wherein said material includes activated alumina for removing acid vapors of said liquids.

7. The invention of claim 1 wherein said material is in loose particulate form.

8. The invention of claim 1 wherein said material is carried on a fiber sheet coiled up within said shell.

9. The invention of claim 2 wherein said material is carried on at fiber sheet coiled up within said shell.

* * * * *